(12) United States Patent
Ellis et al.

(10) Patent No.: US 8,814,517 B2
(45) Date of Patent: Aug. 26, 2014

(54) APPARATUS AND METHODS FOR COOLING PLATFORM REGIONS OF TURBINE ROTOR BLADES

(75) Inventors: Scott Edmond Ellis, Easley, SC (US); Xiaoyong Fu, Greer, SC (US)

(73) Assignee: General Electric Company, Schenectady, NY (US)

( * ) Notice: Subject to any disclaimer, the term of this patent is extended or adjusted under 35 U.S.C. 154(b) by 1000 days.

(21) Appl. No.: 12/894,914

(22) Filed: Sep. 30, 2010

(65) Prior Publication Data

US 2012/0082565 A1 Apr. 5, 2012

(51) Int. Cl.
*F01D 5/18* (2006.01)

(52) U.S. Cl.
USPC ............ 416/96 R; 416/97 A; 416/193 A; 29/889.721; 29/527.6

(58) Field of Classification Search
USPC .......... 415/115, 116, 138, 139; 416/95, 96 R, 416/96 A, 97 R, 97 A, 193 A; 29/889.7, 29/889.71, 889.72, 889.721, 889.722, 29/402.01, 402.03–402.07, 464–469, 514, 29/525, 527.1, 527.5, 527.6; 409/131
See application file for complete search history.

(56) References Cited

U.S. PATENT DOCUMENTS

| | | | |
|---|---|---|---|
| 3,950,114 A | 4/1976 | Helms | |
| 4,712,979 A | 12/1987 | Finger | |
| 4,767,260 A * | 8/1988 | Clevenger et al. | 415/115 |
| 4,798,514 A | 1/1989 | Pask | |
| 4,902,198 A * | 2/1990 | North | 415/115 |
| 5,340,278 A | 8/1994 | Magowan | |
| 5,382,135 A | 1/1995 | Green | |
| 5,813,835 A | 9/1998 | Corsmeier et al. | |
| 6,017,819 A | 1/2000 | Brigham et al. | |
| 6,019,579 A | 2/2000 | Fukuno et al. | |
| 6,120,249 A | 9/2000 | Hultgren et al. | |
| 6,190,130 B1 | 2/2001 | Fukue et al. | |
| 6,196,799 B1 | 3/2001 | Fukue et al. | |
| 6,402,417 B1 | 6/2002 | Okamoto | |
| 6,431,833 B2 | 8/2002 | Jones | |
| 6,457,935 B1 * | 10/2002 | Antunes et al. | 415/115 |
| 6,478,540 B2 | 11/2002 | Abuaf et al. | |
| 7,097,424 B2 | 8/2006 | Cunha et al. | |
| 7,147,439 B2 | 12/2006 | Jacala et al. | |
| 7,198,467 B2 | 4/2007 | Keith et al. | |
| 7,347,664 B2 | 3/2008 | Kayser et al. | |

(Continued)

FOREIGN PATENT DOCUMENTS

JP 2005-146858 A * 6/2005 ................ F01D 5/18

*Primary Examiner* — Christopher Verdier
(74) *Attorney, Agent, or Firm* — Mark E. Henderson; Ernest G. Cusick; Frank A. Landgraff

(57) ABSTRACT

In a turbine rotor blade having a platform at an interface between an airfoil and a root, wherein the airfoil and the root include an interior cooling passage formed therein, wherein, in operation, the interior cooling passage comprises at least a high-pressure coolant region and a low-pressure coolant region, platform cooling arrangement that includes: a platform slot extending circumferentially from a mouth formed through the pressure side slashface; a high-pressure connector that connects the platform slot to the high-pressure coolant region of the interior cooling passage; a low-pressure connector that connects the platform slot to the low-pressure coolant region of the interior cooling passage; and a platform cooling cartridge removably engaged within the platform slot, the platform cooling cartridge comprising one or more cartridge cooling channels.

20 Claims, 10 Drawing Sheets

(56) References Cited

U.S. PATENT DOCUMENTS

| | | |
|---|---|---|
| 7,416,391 B2 | 8/2008 | Veltre et al. |
| 2006/0056968 A1 | 3/2006 | Jacala et al. |
| 2006/0269409 A1* | 11/2006 | Torii et al. .................. 416/97 R |
| 2007/0189896 A1 | 8/2007 | Itzel et al. |
| 2008/0190114 A1* | 8/2008 | Surace et al. ............... 416/97 R |
| 2009/0028692 A1* | 1/2009 | Surace et al. ................. 415/115 |
| 2009/0116953 A1* | 5/2009 | Spangler et al. .............. 415/115 |

* cited by examiner

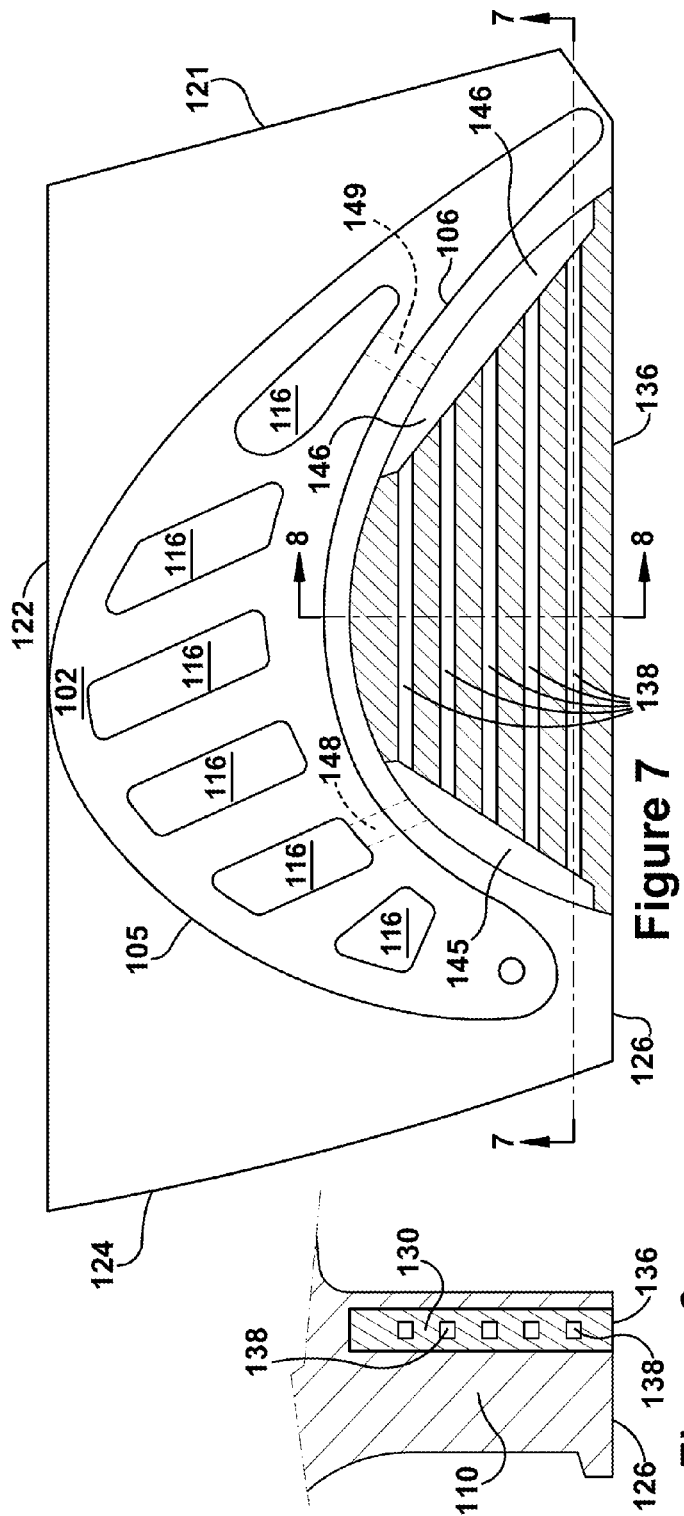
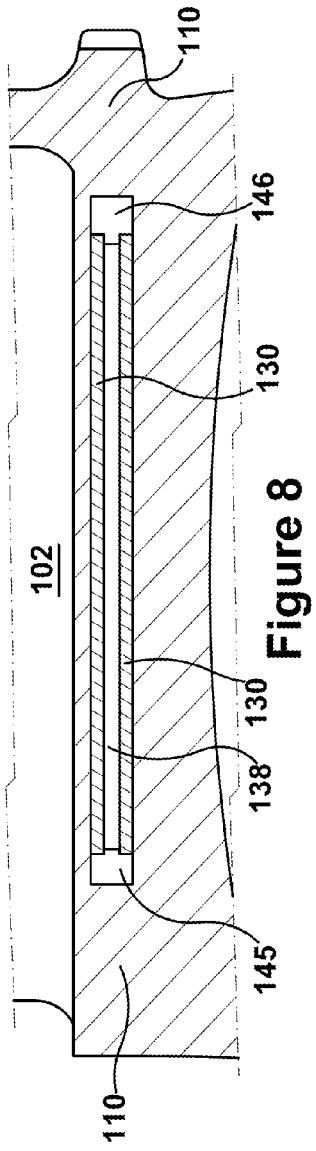

APPARATUS AND METHODS FOR COOLING PLATFORM REGIONS OF TURBINE ROTOR BLADES

BACKGROUND OF THE INVENTION

The present application relates generally to combustion turbine engines, which, as used herein and unless specifically stated otherwise, includes all types of combustion turbine engines, such as those used in power generation and aircraft engines. More specifically, but not by way of limitation, the present application relates to apparatus, systems and/or methods for cooling the platform region of turbine rotor blades.

A gas turbine engine typically includes a compressor, a combustor, and a turbine. The compressor and turbine generally include rows of airfoils or blades that are axially stacked in stages. Each stage typically includes a row of circumferentially spaced stator blades, which are fixed, and a set of circumferentially spaced rotor blades, which rotate about a central axis or shaft. In operation, the rotor blades in the compressor are rotated about the shaft to compress a flow of air. The compressed air is then used within the combustor to combust a supply of fuel. The resulting flow of hot gases from the combustion process is expanded through the turbine, which causes the rotor blades to rotate the shaft to which they are attached. In this manner, energy contained in the fuel is converted into the mechanical energy of the rotating shaft, which then, for example, may be used to rotate the coils of a generator to generate electricity.

Referring to FIGS. 1 and 2, turbine rotor blades 100 generally include an airfoil portion or airfoil 102 and a root portion or root 104. The airfoil 102 may be described as having a convex suction face 105 and a concave pressure face 106. The airfoil 102 further may be described as having a leading edge 107, which is the forward edge, and a trailing edge 108, which is the aft edge. The root 104 may be described as having structure (which, as shown, typically includes a dovetail 109) for affixing the blade 100 to the rotor shaft, a platform 110 from which the airfoil 102 extends, and a shank 112, which includes the structure between the dovetail 109 and the platform 110.

As illustrated, the platform 110 may be substantially planar. (Note that "planar," as used herein, means approximately or substantially in the shape of a plane. For example, one of ordinary skill in the art will appreciate that platforms may be configured to have an outboard surface that is slight curved and convex, with the curvature corresponding to the circumference of the turbine at the radial location of the rotor blades. As used herein, this type of platform shape is deemed planar, as the radius of curvature is sufficiently great to give the platform a flat appearance.) More specifically, the platform 110 may have a planar topside 113, which, as shown in FIG. 1, may include an axially and circumferentially extending flat surface. As shown in FIG. 2, the platform 110 may have a planar underside 114, which may also include an axially and circumferentially extending flat surface. The topside 113 and the bottom side 114 of the platform 110 may be formed such that each is substantially parallel to the other. As depicted, it will be appreciated that the platform 110 typically has a thin radial profile, i.e., there is a relatively short radial distance between the topside 113 and the bottom side 114 of the platform 110.

In general, the platform 110 is employed on turbine rotor blades 100 to form the inner flow path boundary of the hot gas path section of the gas turbine. The platform 110 further provides structural support for the airfoil 102. In operation, the rotational velocity of the turbine induces mechanical loading that creates highly stressed regions along the platform 110 that, when coupled with high temperatures, ultimately cause the formation of operational defects, such as oxidation, creep, low-cycle fatigue cracking, and others. These defects, of course, negatively impact the useful life of the rotor blade 100. It will be appreciated that these harsh operating conditions, i.e., exposure to extreme temperatures of the hot gas path and mechanical loading associated with the rotating blades, create considerable challenges in designing durable, long-lasting rotor blade platforms 110 that both perform well and are cost-effective to manufacture.

One common solution to make the platform region 110 more durable is to cool it with a flow of compressed air or other coolant during operation, and a variety of these types of platform designs are known. However, as one of ordinary skill in the art will appreciate, the platform region 110 presents certain design challenges that make it difficult to cool in this manner. In significant part, this is due to the awkward geometry of this region, in that, as described, the platform 110 is a periphery component that resides away from the central core of the rotor blade and typically is designed to have a structurally sound, but thin radial thickness.

To circulate coolant, rotor blades 100 typically include one or more hollow cooling passages 116 (see FIGS. 3, 4 and 5) that, at minimum, extend radially through the core of the blade 100, including through the root 104 and the airfoil 102. As described in more detail below, to increase the exchange of heat, such cooling passages 116 may be formed having a serpentine path that winds through the central regions of the blade 100, though other configurations are possible. In operation, a coolant may enter the central cooling passages via one or more inlets 117 formed in the inboard portion of the root 104. The coolant may circulate through the blade 100 and exit through outlets (not shown) formed on the airfoil and/or via one or more outlets (not shown) formed in the root 104. The coolant may be pressurized, and, for example, may include pressurized air, pressurized air mixed with water, steam, and the like. In many cases, the coolant is compressed air that is diverted from the compressor of the engine, though other sources are possible. As discussed in more detail below, these cooling passages typically include a high-pressure coolant region and a low-pressure coolant region. The high-pressure coolant region typically corresponds to an upstream portion of the cooling passage that has a higher coolant pressure, whereas the low-pressure coolant region corresponds to a downstream portion having a relatively lower coolant pressure.

In some cases, the coolant may be directed from the cooling passages 116 into a cavity 119 formed between the shanks 112 and platforms 110 of adjacent rotor blades 100. From there, the coolant may be used to cool the platform region 110 of the blade, a conventional design of which is presented in FIG. 3. This type of design typically extracts air from one of the cooling passages 116 and uses the air to pressurize the cavity 119 formed between the shanks 112/platforms 110. Once pressurized, this cavity 119 then supplies coolant to cooling channels that extend through the platforms 110. After traversing the platform 110, the cooling air may exit the cavity through film cooling holes formed in the topside 113 of the platform 110.

It will be appreciated, however, that this type of conventional design has several disadvantages. First, the cooling circuit is not self-contained in one part, as the cooling circuit is only formed after two neighboring rotor blades 100 are assembled. This adds a great degree of difficulty and complexity to installation and pre-installation flow testing. A second disadvantage is that the integrity of the cavity 119 formed between adjacent rotor blades 100 is dependent on how well the perimeter of the cavity 119 is sealed. Inadequate sealing may result in inadequate platform cooling and/or wasted cooling air. A third disadvantage is the inherent risk that hot gas path gases may be ingested into the cavity 119 or the platform itself 110. This may occur if the cavity 119 is not maintained at a sufficiently high pressure during operation. If the pressure of the cavity 119 falls below the pressure within the hot gas path, hot gases will be ingested into the shank cavity 119 or the platform 110 itself, which typically damages these components as they were not designed to endure exposure to the hot gas-path conditions.

FIGS. 4 and 5 illustrate another type of conventional design for platform cooling. In this case, the cooling circuit is contained within the rotor blade 100 and does not involve the shank cavity 119, as depicted. Cooling air is extracted from one of the cooling passages 116 that extend through the core of the blade 110 and directed aft through cooling channels 120 formed within the platform 110 (i.e., "platform cooling channels 120"). As shown by the several arrows, the cooling air flows through the platform cooling channels 120 and exits through outlets in the aft edge 121 of the platform 110 or from outlets disposed along the suction side edge 122. (Note that in describing or referring to the edges or faces of the rectangular platform 110, each may be delineated based upon its location in relation to the suction face 105 and pressure face 106 of the airfoil 102 and/or the forward and aft directions of the engine once the blade 100 is installed. As such, as one of ordinary skill in the art will appreciate, the platform may include an aft edge 121, a suction side edge 122, a forward edge 124, and a pressure side edge 126, as indicated in FIGS. 3 and 4. In addition, the suction side edge 122 and the pressure side edge 126 also are commonly referred to as "slashfaces" and the narrow cavity formed therebetween once neighboring rotor blades 100 are installed may be referred to as a "slashface cavity".)

It will be appreciated that the conventional designs of FIGS. 4 and 5 have an advantage over the design of FIG. 3 in that they are not affected by variations in assembly or installation conditions. However, conventional designs of this nature have several limitations or drawbacks. First, as illustrated, only a single circuit is provided on each side of the airfoil 102 and, thus, there is the disadvantage of having limited control of the amount of cooling air used at different locations in the platform 110. Second, conventional designs of this type have a coverage area that is generally limited. While the serpentine path of FIG. 5 is an improvement in terms of coverage over FIG. 4, there are still dead areas within the platform 110 that remain uncooled. Third, to obtain better coverage with intricately formed platform cooling channels 120, manufacturing costs increase dramatically, particularly if the cooling channels having shapes that require a casting process to form. Fourth, these conventional designs typically dump coolant into the hot gas path after usage and before the coolant is completely exhausted, which negatively affects the efficiency of the engine. Fifth, conventional designs of this nature generally have little flexibility. That is, the channels 120 are formed as an integral part of the platform 110 and provide little or no opportunity to change their function or configuration as operating conditions vary. In addition, these types of conventional designs are difficult to repair or refurbish.

As a result, conventional platform cooling designs are lacking in one or more important areas. There remains a need for improved apparatus, systems, and methods that effectively and efficiently cool the platform region of turbine rotor blades, while also being cost-effective to construct, flexible in application, and durable.

BRIEF DESCRIPTION OF THE INVENTION

The present application thus describes a platform cooling arrangement in a turbine rotor blade having a platform at an interface between an airfoil and a root. The airfoil and the root may include an interior cooling passage formed therein, wherein, in operation, the interior cooling passage comprises at least a high-pressure coolant region and a low-pressure coolant region, and wherein, along an edge that coincides with the pressure side of the airfoil, the platform comprises a pressure side slashface. The platform cooling configuration may include: a platform slot extending circumferentially from a mouth formed through the pressure side slashface; a high-pressure connector that connects the platform slot to the high-pressure coolant region of the interior cooling passage; a low-pressure connector that connects the platform slot to the low-pressure coolant region of the interior cooling passage; and a platform cooling cartridge removably engaged within the platform slot, the platform cooling cartridge comprising one or more cartridge cooling channels.

The present application further describes a method of creating a platform cooling arrangement in the turbine rotor blade having a platform at the interface between an airfoil and a root (wherein the airfoil and the root include an interior cooling passage formed therein, the interior cooling passage being configured to connect to a coolant source through the root, wherein the interior cooling passage has at least a high-pressure coolant region and a low-pressure coolant region, and wherein, along a circumferential edge that coincides with a pressure side of the airfoil, the platform includes a pressure side slashface). In one embodiment, the method includes the steps of: forming a platform slot in the platform, the platform slot extending circumferentially from a mouth formed in the pressure side slashface; from within the formed platform slot, machining high-pressure connector that connects the platform slot to the high-pressure coolant region of the interior cooling passage; from within the formed platform slot, machining low-pressure connector that connects the platform slot to the low-pressure coolant region of the interior cooling passage; and forming a platform cooling cartridge that includes one or more platform cooling channels and comprises a predetermined size that desirably installs within the platform slot; and installing the platform cooling cartridge such that the platform cooling cartridge is removably contained within the platform slot. The platform cooling channels may be configured to allow a flow of coolant to pass through the platform cooling cartridge from the high-pressure connector to the low-pressure connector. The platform cooling channels may be configured to promote the exchange of heat between the flow of coolant and the platform cooling cartridge as the flow of coolant passes therethrough.

These and other features of the present application will become apparent upon review of the following detailed description of the preferred embodiments when taken in conjunction with the drawings and the appended claims.

BRIEF DESCRIPTION OF THE DRAWINGS

These and other features of this invention will be more completely understood and appreciated by careful study of the following more detailed description of exemplary embodiments of the invention taken in conjunction with the accompanying drawings, in which:

FIG. 7 illustrates a top with partial cross-sectional view of the turbine rotor blade and platform cooling cartridge of FIG. 6 in an assembled state;

FIG. 8 illustrates a cross-sectional view along 7-7 of FIG. 7;

FIG. 9 illustrates a cross-sectional view along 8-8 of FIG. 7;

DETAILED DESCRIPTION OF THE INVENTION

Figure 10:
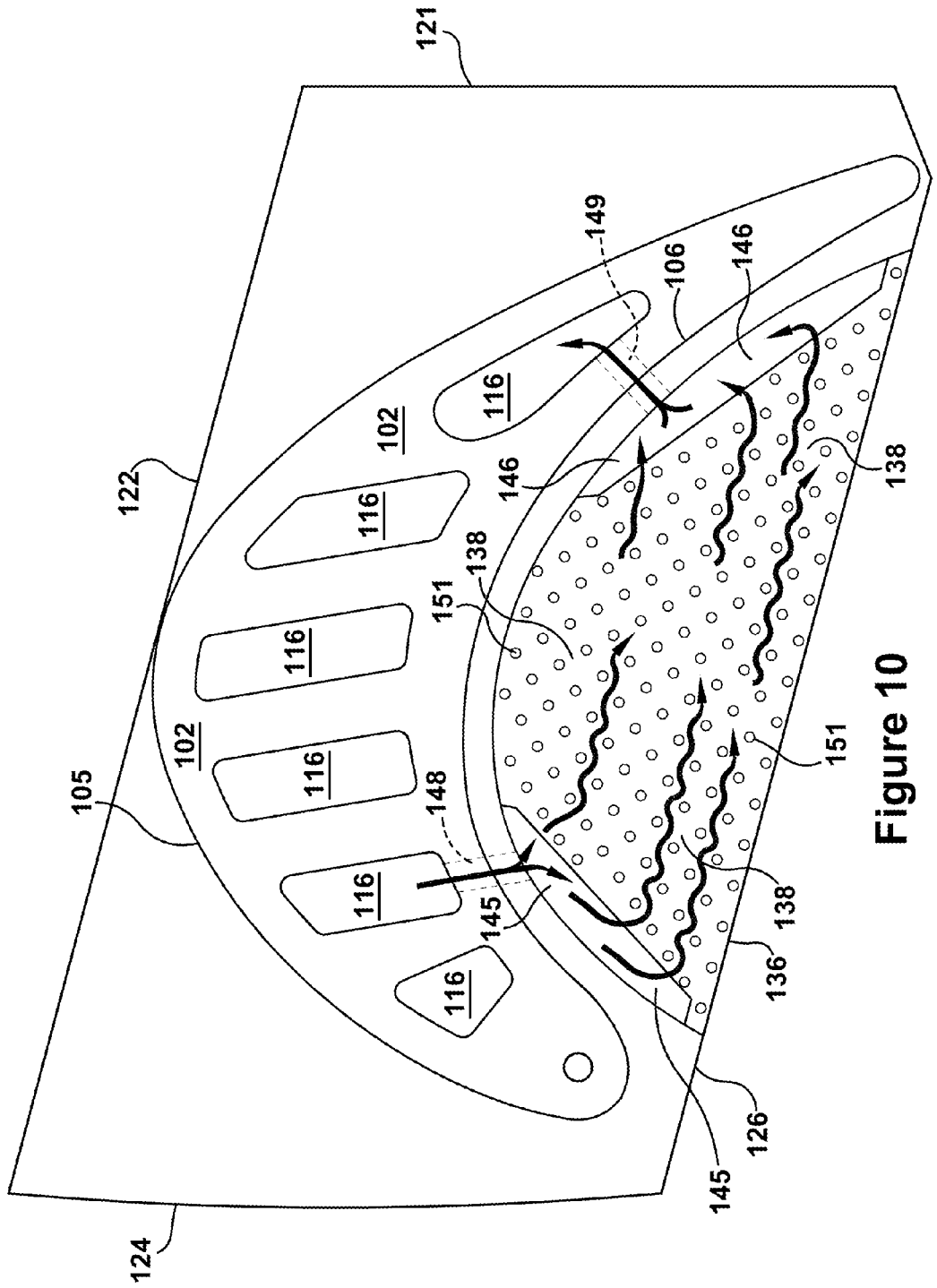
FIG. 10 illustrates a top with partial cross-sectional view of a turbine rotor blade having a platform cooling cartridge according to an alternative embodiment of the present invention.
Figure 11:
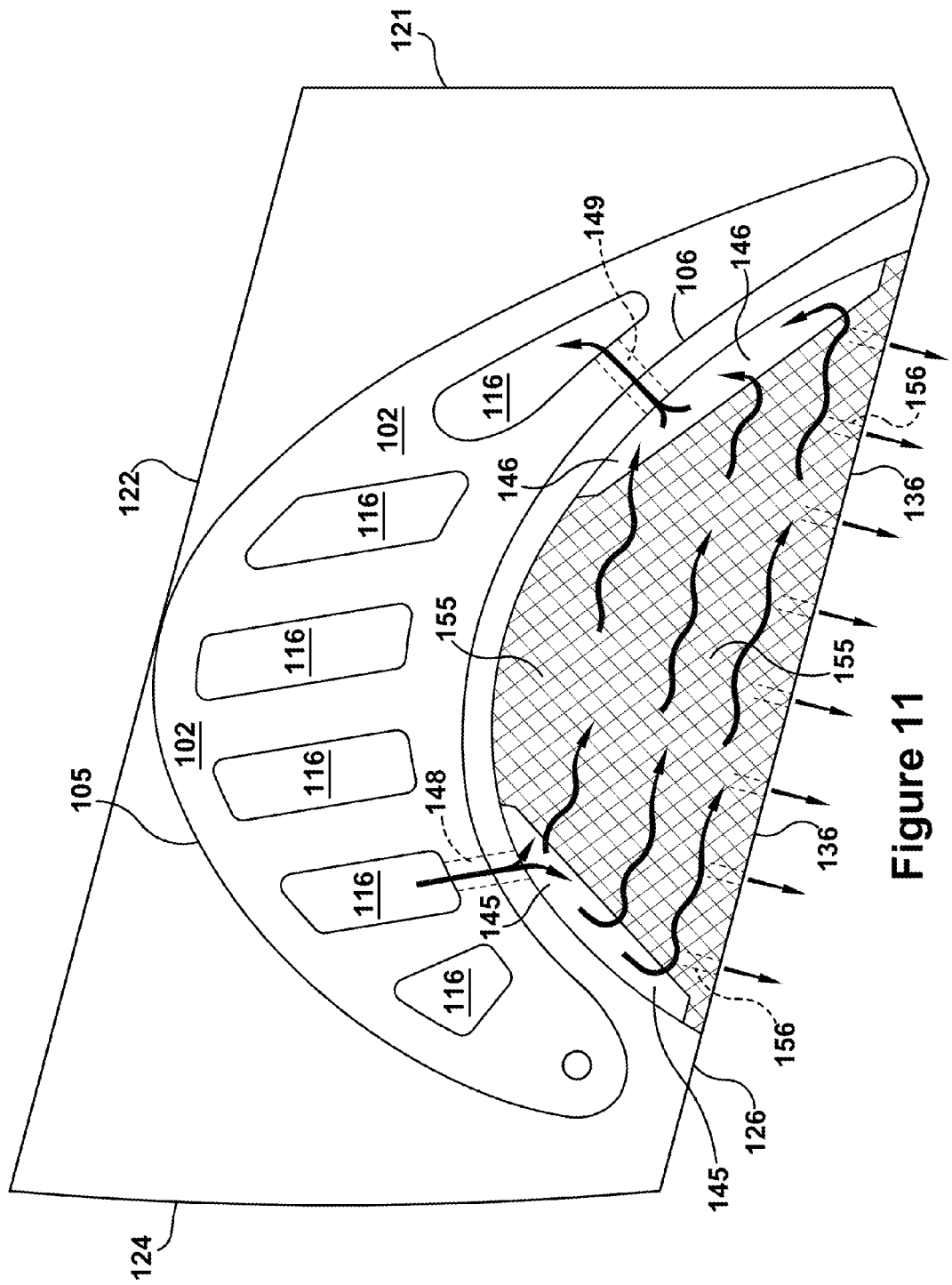
FIG. 11 illustrates a top with partial cross-sectional view of a turbine rotor blade having a platform cooling cartridge according to an alternative embodiment of the present invention.

It will be appreciated that turbine blades that are cooled via the internal circulation of a coolant typically include an interior cooling passage 116 that extends radially outward from the root, through the platform region, and into the airfoil, as described above in relation to several conventional cooling designs. It will be appreciated that certain embodiments of the present invention may be used in conjunction with conventional coolant passages to enhance or enable efficient active platform cooling, and the present invention is discussed in connection with a common design: an interior cooling passage 116 having a winding or serpentine configuration. As depicted in FIGS. 7, 10, and 11, the serpentine path is typically configured to allow a one-way flow of coolant and includes features that promote the exchange of heat between the coolant and the surrounding rotor blade 100. In operation, a pressurized coolant, which typically is compressed air bled from the compressor (though other types of coolant, such as steam, also may be used with embodiments of the present invention), is supplied to the interior cooling passage 116 through a connection formed through the root 104. The pressure drives the coolant through the interior cooling passage 116, and the coolant convects heat from the surrounding walls.

As the coolant moves through the cooling passage 116, it will be appreciated that it loses pressure, with the coolant in the upstream portions of the interior cooling passage 116 having a higher pressure than coolant in downstream portions. As discussed in more detail below, this pressure differential may be used to drive coolant across or through cooling passages formed in the platform. It will be appreciated that the present invention may be used in rotor blades 100 having internal cooling passages of different configurations and is not limited to interior cooling passages having a serpentine form. Accordingly, as used herein, the term "interior cooling passage" or "cooling passage" is meant to include any passage or hollow channel through which coolant may be circulated in the rotor blade. As provided herein, the interior cooling passage 116 of the present invention extends to at least to the approximate radial height of the platform 116, and may include at least one region of relatively higher coolant pressure (which, hereinafter, is referred to as a "region of high pressure" and, in some cases, may be an upstream section within a serpentine passage) and at least one region of relatively lower coolant pressure (which, hereinafter, is referred to as a "region of low pressure" and, relative to the region of high pressure, may be a downstream section within a serpentine passage).

In general, the various designs of conventional internal cooling passages 116 are effective at providing active cooling to certain regions within the rotor blade 100. However, as one of ordinary skill in the art will appreciate, the platform region proves more challenging. This is due, at least in part, to the platform's awkward geometry—i.e., its narrow radial height and the manner in which it juts away from the core or main body of the rotor blade 100. However, given its exposures to the extreme temperatures of hot gas path and high mechanical loading, the cooling requirements of the platform are considerable. As described above, conventional platform cooling designs are ineffective because they fail to address the particular challenges of the region, are inefficient with their usage of coolant, and/or are costly to fabricate.

Referring again to the figures, FIGS. 6 through 11 provide several views of exemplary embodiments of the present invention. As shown, the present invention generally includes a removable platform cooling cartridge 130 that installs within a turbine rotor blade 100. More specifically, the platform 110 of the rotor blade 100 may include a platform slot 134 that is formed so that the cooling cartridge 130 fits therein. As shown, in an exemplary embodiment, the platform slot 134 may be formed through the pressure side slashface or edge 126 (though other locations along the other edges of the platform 110 are also possible, such as the suction side slashface 122). The platform slot 134 may have a rectangular shaped mouth. As shown, the mouth may be configured such that it is relatively thin in the radial direction and relatively wide in the axial direction. It will be appreciated that, from the mouth, the platform slot 134 extends circumferential into the platform 110, thereby forming a cavity therein.

The platform cooling cartridge 130 may have a thin disk-like shape and may be configured such that it fits snugly within the platform slot 134. As discussed in more detail below, the cooling cartridge 130 may include a plurality of cooling channels 138. In addition, the cooling cartridge 130 may have a flat, rectangular outer face 136 that, once the cooling cartridge 130 is properly installed within the platform slot 134, substantially covers, blocks, or seals the mouth of the platform slot 134. In some preferred embodiments, as discussed in more detail below, the outer face 136 prevents coolant from exiting the blade 100 through the mouth of the platform slot 134.

Figure 1:
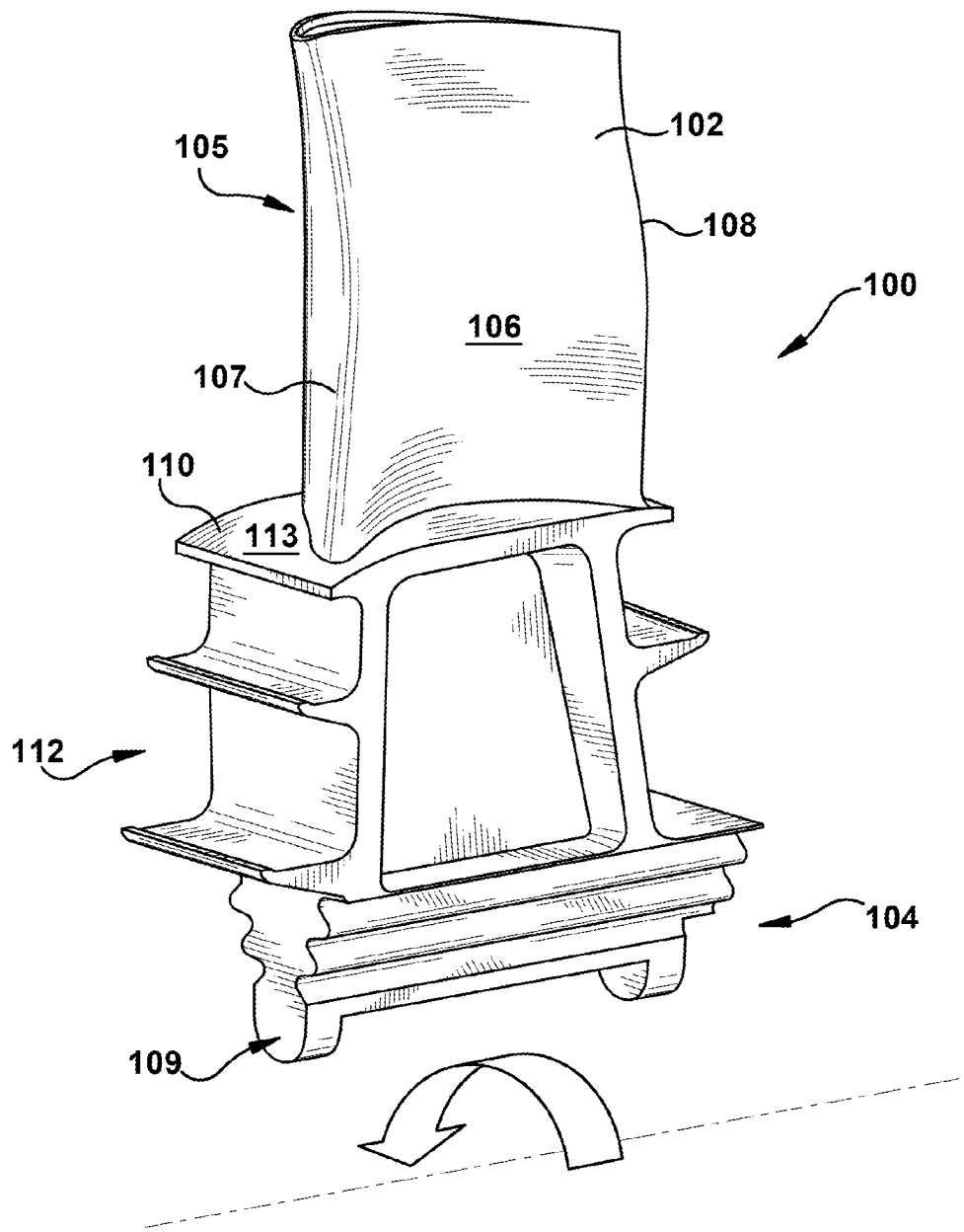
FIG. 1 illustrates a perspective view of an exemplary turbine rotor blade in which embodiments of the present invention may be employed.
Figure 2:
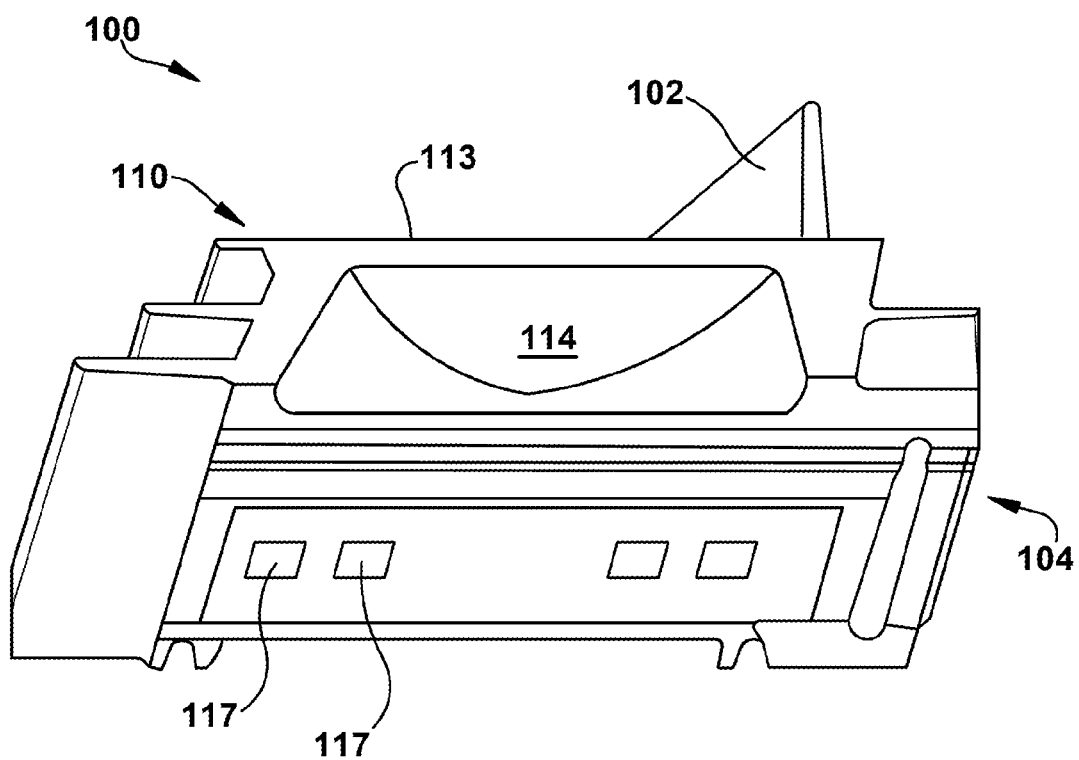
FIG. 2 illustrates an underside view of a turbine rotor blade in which embodiments of the present invention may be used.
Figure 3:
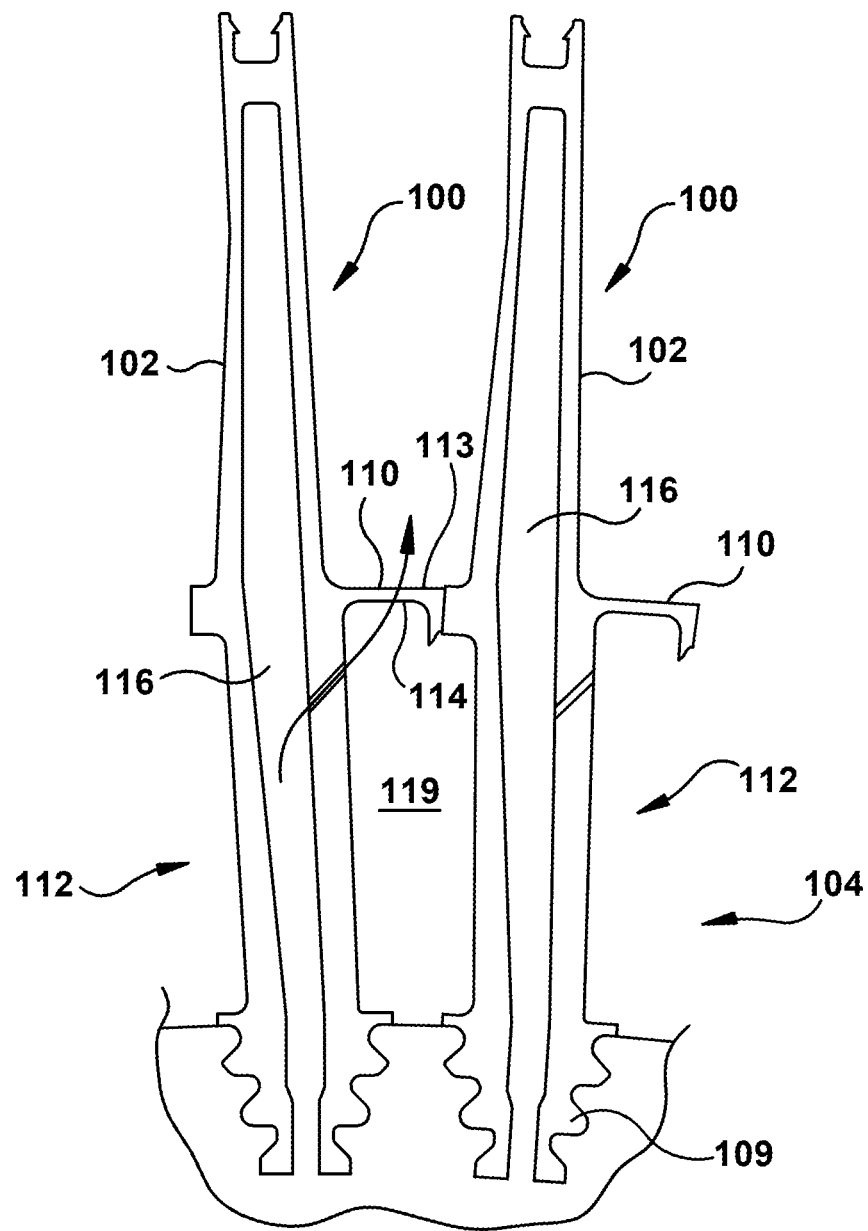
FIG. 3 illustrates a sectional view of neighboring turbine rotor blades having a cooling system according to conventional design.
Figure 4:
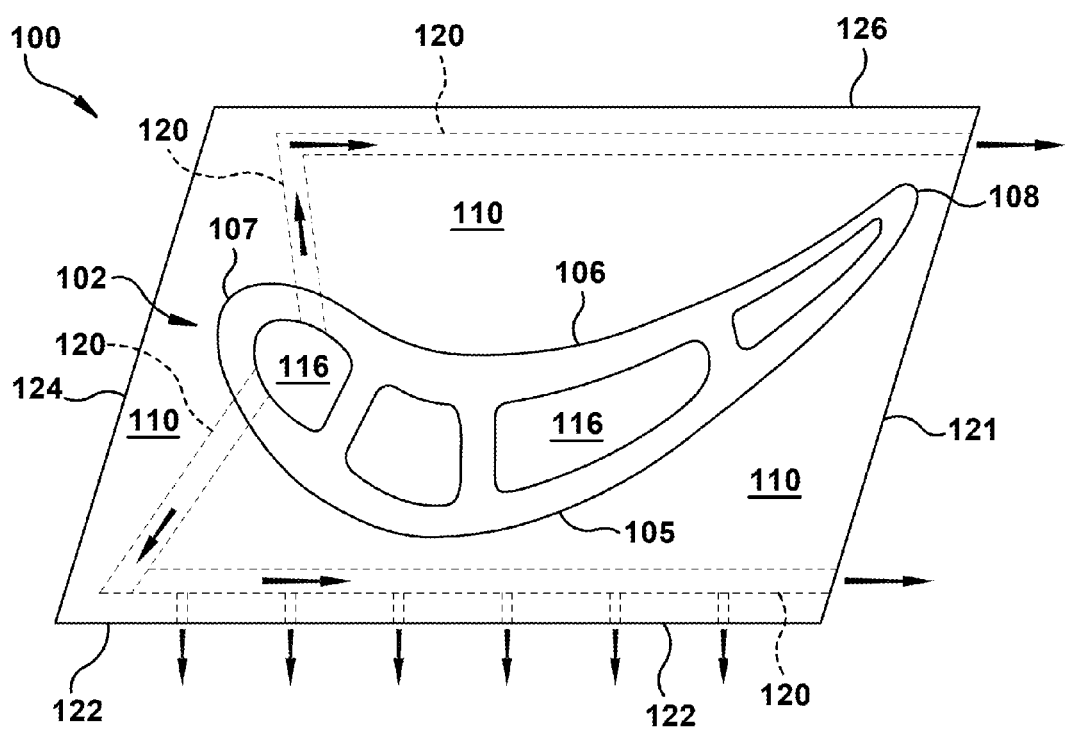
FIG. 4 illustrates a top view of a turbine rotor blade having a platform with interior cooling channels according to conventional design.
Figure 5:
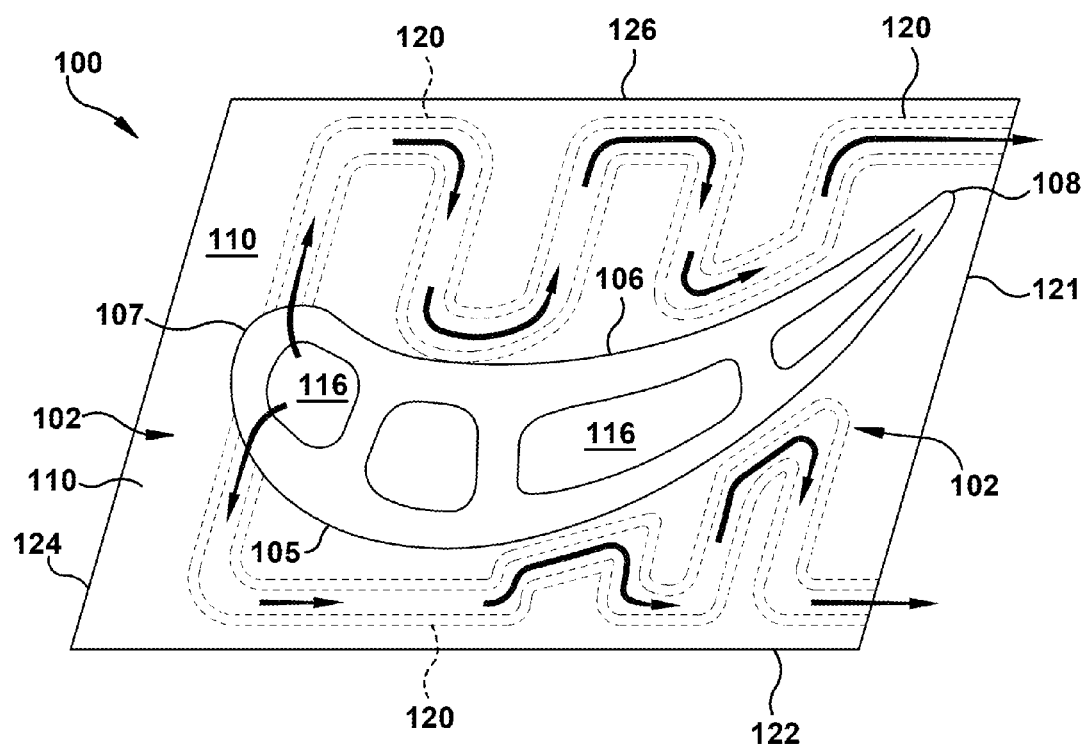
FIG. 5 illustrates a top view of a turbine rotor blade having a platform with interior cooling channels according to an alternative conventional design.
Figure 6:
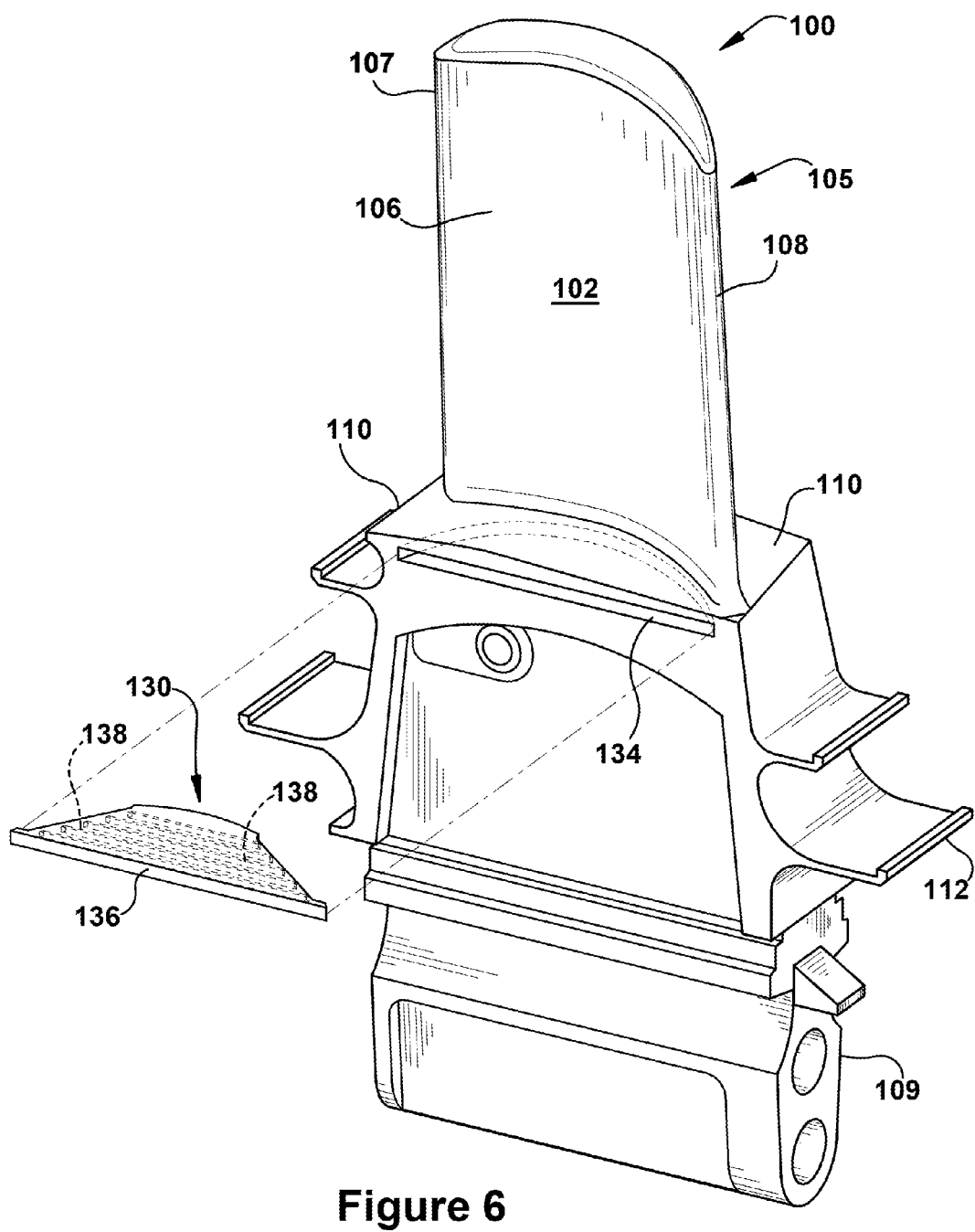
FIG. 6 illustrates a perspective view of a turbine rotor blade and platform cooling cartridge in disassembled state according to an exemplary embodiment of the present invention.

As stated, the platform 110 may include an integrally formed platform slot 134. The shape of the platform slot 134 may vary. In a preferred embodiment, as shown in FIG. 6, the platform slot 134 may extend circumferentially from the pressure side slashface or edge 126. The platform slot 134, in this preferred embodiment, narrows as it extends from the mouth in the slashface 126 toward the center of the platform 110. The narrowing may generally correspond to the curved profile that is formed at the junction of the pressure face 106 of the airfoil 102 and the platform 110 ("profile" refers to the perspective of FIGS. 7, 10, and 11). As such, the platform slot 134 may have a curved inner or backwall that relates closely in shape and position to the curved shape of the profile of the pressure face 106 of the airfoil 102. More particularly, the backwall may arc from a forward position near the forward edge of the mouth of the platform slot 134 to an aft position near the aft edge of the mouth. It should be apparent to those skilled in the art that other configurations of the platform slot 134 also may be employed. However, it will be appreciated that the platform slot 134 of the preferred embodiments of FIGS. 6 through 11 may be used to efficiently provide cooling coverage to substantially all portions of the pressure side of the platform 110. Those of ordinary skill in the art will appreciate that other performance advantages are possible.

The cooling cartridge 130 and the platform slot 134 may be configured such that, once assembled, one or more plenums 145, 146 are formed within the platform slot 134. More particularly, the plenums 145, 146 are formed between the outer wall of the cooling cartridge 130 and the inner wall of the platform slot 134. As shown in FIG. 7, the plenums may include a high-pressure plenum 145, which, in the embodiment shown, is formed along the forward areas of the platform slot 134. And, as also shown in FIG. 6, a low-pressure plenum 146 may be formed along the aft areas of the platform slot 134. The function of the plenums 145, 146 will be discussed in more detail below.

As illustrated in FIG. 7, two connectors, a high-pressure connector 148 and a low-pressure connector 149, may be provided to connect the interior cooling passage 116 to the platform slot 134 in any desired manner. While not specifically indicated, it will be appreciated that the following description of operation assumes that the upstream portions of the interior cooling passage 116 reside toward the leading edge 107 of the turbine blade 100, and that the downstream portions of the interior cooling passage 116 resides toward the trailing edge 108 of the turbine blade 100. (However, this configuration is not necessary for the practice of the current invention and is exemplary only.) In operation, a coolant may enter the interior cooling passage 116 at a position near the leading edge 107 of the airfoil 102 and alternately flow radially outward/inward through the interior cooling passage 116 as the coolant meanders in an aftwise direction. As shown, the high-pressure connector 148 may be configured such that an upstream (and higher pressure) portion of the interior cooling passage 116 fluidly communicates with a predetermined portion of the platform slot 134, which, as stated, may be referred to as the high-pressure plenum 145. The low-pressure connector 148 may be configured such that a downstream portion of the cooling passage fluidly communicates with a predetermined portion of the platform slot 134, which, as stated, may be referred to as the low-pressure plenum 146. (It will be appreciated that, in some embodiments, the high-pressure plenum 145 and the low-pressure plenum 146 may not be present.)

The cartridge 130 may be securely assembled into the slot 134. This may be done via interference fit, such as peening, or through welding, brazing, or other conventional assembly methods. However, because of the cartridge 130 is not integral to the platform 110 of the rotor blade 100, the cartridge 130 remains detachable (i.e., able to be removed for reuse, repair, tuning, inspection, and be reattached for continued use or replaced with another new or modified cartridge 130) given any of these types of connections. As stated, once the platform cooling cartridge 130 is installed, the mouth of the platform slot 134 may be sealed via conventional methods. This may be done to prevent or discourage or meter leakage through the slashface and/or the escape of coolant into the hot gas-path at this location. In other embodiments, as discussed in more detail below, cooling apertures that connect to the cartridge cooling channels 138 also may be provided. It will be appreciated that preventing leakage through the pressure side slashface 126 means that the substantially all of the coolant flowing through the platform slot 134 is directed back into the interior cooling passage 116, where it may be further used to cool other areas of the blade 100 or employed in some other fashion.

To cool the platform, the platform cooling cartridge 130 generally includes one or more cooling channels 138 that allow coolant to flow through the cooling cartridge 130 and, generally, between the high-pressure connector 148 and the low-pressure connector 149. This flow is driven by the pressure differential between the two areas. In general, the cooling channels 138 are configured such that the flow of the coolant therethrough promotes the removal of heat from the platform 110. FIGS. 6 through 11 provide several views of a preferred embodiment of the cooling channels 138. While several preferred embodiments of platform cooling channels 138 are described herein, it will be appreciated that the present invention is not so limited, and that cooling channels 138 of other configurations may be used with success. As shown, in one preferred embodiment, the cartridge 130 may include multiple axially-oriented, parallel cooling channels 138 that extend from the high-pressure plenum 145 to the low-pressure plenum 146. The cooling channels 138, thus formed, promote convective cooling through this area of the platform 110 as the coolant moves across the platform slot 134 and through the cooling channels 138. Particularly, the coolant convects heat away from the walls of the cooling cartridge 130, and, in turn, the cooling cartridge 130 conducts heat from the surrounding areas of the platform 110.

The cooling cartridge 130 and the platform slot 134, as stated, may be configured such that, upon assembly, two separate gaps or plenums are formed at predetermined locations within the platform slot 134, i.e., the high-pressure plenum 145 and the low-pressure plenum 146. Generally, the two plenums 145, 146 comprise a void or manifold that is defined by the outer surface of the cooling cartridge 130 and a curved back or inner wall of the platform slot 134, which is best illustrated in FIGS. 7 and 10. It will be appreciated that in certain embodiments of the present invention one or more of the described plenums may not be present. In such embodiments, for example, the coolant flowing from the high-pressure connector 148 would flow directly into a cooling channel 138 upon entering the platform slot 134; or, for example, the coolant flowing into the low-pressure connector 149 would flow directly from a cooling channel 138 without flowing first through the low-pressure plenum 146.

The high-pressure plenum 145 may be positioned along a forward portion of the inner wall of the platform slot 134, commencing at a position just inside the mouth and ending just forward of the center or midpoint of the inner wall. The low-pressure plenum 146 may be positioned along an aft portion of the inner wall of the platform slot 134, commencing at a position just inside the mouth and ending just aft of the center or midpoint of the inner wall. It will be appreciated that the platform cooling cartridge 130 is configured such that the created plenums 145, 146 are separated by at least a portion of the cooling cartridge 130. While some coolant may bypass the cooling cartridge 130, this configuration requires that at least some of the coolant traversing the platform slot 134 flows through at least a portion of the cartridge cooling channels 138. In some embodiments, the cooling cartridge 130 may be configured such that substantially all of the coolant flows through it (i.e., substantially all of the coolant is prevented from bypassing the platform cooling cartridge 130).

As shown, the high-pressure plenum 145 connects via the high-pressure connector 148 to an upstream portion of the interior cooling passage 116, whereas the low-pressure plenum 146 connects via the low-pressure connector 149 to a downstream portion of the interior cooling passage 116. In this manner, the high-pressure plenum 145 receives a supply of coolant, which is then fed through the cartridge cooling channels 138 to the low-pressure plenum 146. The low-pressure plenum 146 then provides a manifold in which the coolant may collect as well as an outlet via the low-pressure connector 149 through which the coolant may exit the platform slot 134. This outlet, as stated, returns the coolant to the interior cooling passage 116 within the turbine rotor blade 100, which allows the coolant to be used to cool other areas of the turbine blade 100 or in other downstream applications.

FIG. 10 provides an alternative platform cooling cartridge 130 according to another preferred embodiment of the present application. In this case, the cooling cartridge 130 may define a cavity between a cartridge floor and a cartridge ceiling, which are planar and parallel. That is, the cartridge floor and ceiling generally oppose each other across a cavity having a relatively constant height or radial clearance. The cooling cartridge 130 may further include a multitude of pins 151 that extend in a general radial direction between the floor of the cartridge 130 and the ceiling. It will be appreciated that, between the pins 151, cartridge cooling channels 138 are defined. The pins 151 may be constructed so that heat exchange between the coolant flowing through the cartridge 130 and the cartridge 130 is accentuated. More particularly, the pins 151 may be constructed with a highly conductive material and provide an increased surface area through which heat may be exchanged with the coolant. In addition, the pins 151 may create turbulent flow through the platform cooling cartridge 130. It will be appreciated that turbulent, non-laminar flow induces greater heat transfer between the coolant and the surfaces of the cartridge 130. The several arrows provided in FIG. 10 depict how coolant may flow through the present cooling configuration. As shown, coolant may flow from an upstream portion of the interior cooling passage 116 to the high-pressure connector 148 to the high-pressure plenum 145 through the cartridge cooling channels 138 to the low-pressure plenum 146 to the low-pressure connector 149 and, finally, be returned to the interior cooling passage 116 at a downstream portion thereof. In other aspects, the platform cooling cartridge 130 may be configured and perform similarly as the other exemplary embodiments discussed herein.

FIG. 11 provides an alternative platform cooling cartridge 130 according to another preferred embodiment of the present application. In this case, the cooling cartridge 130 includes a porous material 155, the pores of which provide the cooling channels through the cartridge 130. In preferred embodiments, the porous material 155 comprises one of the following materials: metal density mesh, metallic sponge, composite materials, and ceramics. Other conventional materials that include similar pores and that are able to adequately withstand the harsh environment of a combustion turbine engine also may be used. The porous material 155 may be sandwiched in between the ceiling/floor of the platform slot 134 or, in other embodiments, the porous material 155 may be sandwiched between a thin ceiling/floor of the cartridge 130 itself. As before, plenums 145, 146 may be formed, which assist in delivering/collecting the coolant to/from the many pores that are positioned along the periphery of the cartridge 130. An outer face 136 may be brazed on the mouth of the platform slot 134 such that the platform slot 134 is sealed. In this manner, the porous medium and coolant are contained within the platform slot 134 and coolant leakage may be preventive, substantially reduced, or metered. As before, the coolant may be extracted from the upstream portion of the interior cooling passage 116 and, via the high-pressure connector 148 and the high-pressure plenum 145 (if present), directed into the porous material 155. Then, emerging from the other side of the porous material 155, the coolant back may be directed back into the interior cooling passage 116 via the low-pressure plenum 146 and the low-pressure connector 149. It will be appreciated that, because of the large heat transfer surface area per unit of volume that is typical in many porous mediums as well as the manner in which heat exchange in porous material takes place—i.e., through convection, conduction and radiation—porous materials may be used within embodiments of the present invention to greatly improve heat exchange performance.

FIG. 11 illustrates another aspect of the present invention. In some preferred embodiments, one or more cooling apertures 156 may be provided. The cooling apertures 156, as shown, may include channels that, during operation, releases a desired portion of the coolant flowing through the outlets formed through the pressure side slashface 126 (or, not shown, the topside 113 or the underside 114 of the platform 110). The cooling apertures 156 may be narrow so that the released coolant is impinged and directed with velocity against the slashface of the adjacent turbine blade 100, which generally increases its cooling effectiveness. It will be appreciated that the slashface cavity and the slashfaces that define them are difficult regions of the platform 110 to cool, and that slashface cooling apertures 156 may be an effective way to do this. Though not shown, it will be appreciated that cooling apertures 156 may be used in the embodiments of FIGS. 7 and 10, as they may be configured to connect to one or more of the cartridge cooling channels 138 or, more generally, the platform slot 134. In other aspects, the platform cooling cartridge 130 of FIG. 11 may be configured and perform similarly as the other exemplary embodiments discussed herein. In certain embodiments, the platform may include a planar topside that is approximately parallel to a planar underside. In certain embodiments the platform slot opposes the location at which the low-pressure connector connects to the platform slot across at least a significant portion of the platform slot. The platform slot may include a backwall that generally opposes the mouth. In certain embodiments, the backwall may arc from a forward position in proximity to the forward edge of the mouth to an aft position in proximity to the aft edge of the mouth. The profile of the arc may correspond in shape and approximate position to the profile of the pressure side of the airfoil where the pressure side of the airfoil intersects the platform. In certain embodiments, the platform slot may include a planar ceiling and a planar floor that resides a substantially constant radial height from each another and are oriented such that each is substantially parallel to the platform. The platform cooling cartridge may include a substantially constant radial height, and the constant radial height of the platform cooling cartridge may be just less than the constant radial height of the platform slot so that, upon assembly, the platform cooling cartridge inserts snugly into the platform slot. In certain embodiments, the platform cooling cartridge may include a porous material that is positioned such that, in use, at least a portion of the coolant flowing from the high-pressure connector to the low-pressure connector passes through the porous material, and the pores of the porous material may form the cartridge cooling channels. In certain embodiments, the cartridge cooling channel may include a serpentine cooling channel that defines a winding course between the high-pressure connector to the low-pressure connector.ly into the platform slot.

Figure 12:
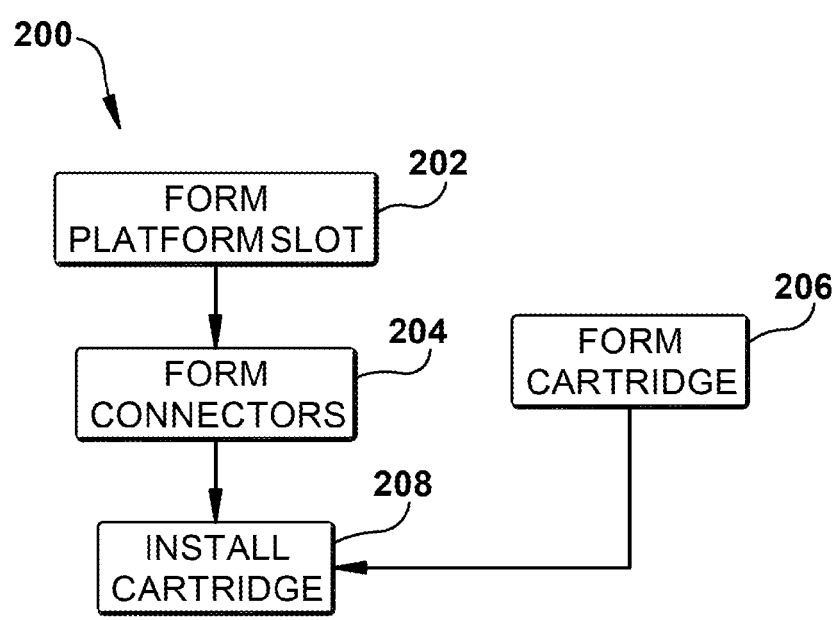
FIG. 12 is an exemplary method of creating a platform cooling arrangement according to an embodiment of the present application.

The present invention further includes a novel method of efficiently forming effective interior cooling channels within the platform region of turbine rotor blades in a cost-effective manner. Referring to flow diagram 200 of FIG. 12, as an initial step 202, the platform slot 134 may be formed in the pressure side slashface 126 of the platform 110. Because of the relatively uncomplicated shape of the platform slot 134, it may be cost-effectively formed using conventional machining or simplified casting processes. Thus, while the present invention may be used to form an array of complex cooling channels that provide broad coverage to the platform region, expensive casting processes that are typically used for such intricate designs may be avoided. Once the platform slot 134 is formed, at a step 204, the high-pressure connector 148 and the low-pressure connector 149 may be created using a conventional, relatively uncomplicated machining process. More specifically, given the access provided by the formation of the platform slot 134, the connectors 148, 149 may be formed via a conventional line-of-sight machining or drilling process.

Separately, at a step 206, a platform cooling cartridge 130 may be formed, the size of which made to desirably correspond to the size of the platform slot 134. As part of this step, the cooling channels 138 may be formed within the cartridge 130. These may be constructed using machining processes, simplified casting processes, or a combination of both. It will be appreciated that manufacturing the cooling channels 138 in a separate cartridge component significantly reduces complexity and cost over the alternative of forming the same cooling channels 138 as an integral component of the rotor blade 100. Finally, at a step 208, the cooling cartridge 130 then may be installed within the platform slot 134 using conventional methods, such as through mechanical interference, welding, brazing, etc.

In operation, the cooling apparatus of the present invention may function as follows. A portion of the coolant supply flowing through the interior cooling passage 116 enters the high-pressure plenum 145 through the high-pressure connector 148. The high-pressure plenum 145 generally provides a chamber through which a plurality of cartridge cooling channels 138 may be supplied coolant. In this manner a single manifold (i.e., the high-pressure connector 148) may effectively supply a number of smaller cooling channels (i.e., the several cartridge cooling channels 138). The coolant then may pass through the cooling channels 138 and collect in the low-pressure plenum 146. The low-pressure plenum 146 generally provides a chamber in which coolant from a plurality cartridge cooling channels 138 may be collected and fed into a single outlet (i.e., the low-pressure connector 149). As it passes through the cooling channels 138, the coolant may convect heat from the platform cooling cartridge 130, and, in turn, the cartridge 130 may conduct heat from the surrounding platform 110, thereby cooling it.

In this manner, the platform cooling arrangement of the present invention extracts a portion of the coolant from the interior cooling passage 116, uses the coolant to remove heat from the platform 110, and then returns the coolant to the interior cooling passage 116, where the coolant may be used to further. The present invention provides a mechanism to actively cool the platform region of a combustion turbine rotor blade. As stated, this region is typically difficult to cool and, given the mechanical loads of the area, is a location that receives high distress as firing temperatures are increased. Accordingly, this type of active platform cooling is a significant enabling technology as higher firing temperatures, increased output, and greater efficiency are sought.

Further, it will be appreciated that the detachable platform cooling cartridge 130 of the present application may provide great flexibility in redesigning, reconfiguring, and/or retrofitting platform cooling arrangements in existing blades. For example, the platform cooling cartridge 130 allows the cooling circuit through the platform 110 to be replaced in a cost effective and convenient manner if operating conditions change or greater cooling is required through the platform region. In addition, the replaceable structure is considerably advantageous during the testing phase of platform cooling arrangements in that alternative designs may be tested without the need to construct whole turbine blades to test various alternatives. The cartridge structure also allows the simplified manufacture of platform cooling channels having complex geometries. Whereas before, complex geometries necessarily meant a costly casting process, the present application teaches methods by which cooling channels of complex design may be formed through simplified machining and/or casting processes. Finally, in some embodiments, the present application teaches a method by which the platform 110 may be cooled using interior channels that do not vent directly into the hot gas-path from the platform 110 itself. As stated, this "recycling" of coolant generally increases the efficiency of its usage, which increases the efficiency of the engine.

As one of ordinary skill in the art will appreciate, the many varying features and configurations described above in relation to the several exemplary embodiments may be further selectively applied to form the other possible embodiments of the present invention. For the sake of brevity and taking into account the abilities of one of ordinary skill in the art, all of the possible iterations is not provided or discussed in detail, though all combinations and possible embodiments embraced by the several claims below or otherwise are intended to be part of the instant application. In addition, from the above description of several exemplary embodiments of the invention, those skilled in the art will perceive improvements, changes, and modifications. Such improvements, changes, and modifications within the skill of the art are also intended to be covered by the appended claims. Further, it should be apparent that the foregoing relates only to the described embodiments of the present application and that numerous changes and modifications may be made herein without departing from the spirit and scope of the application as defined by the following claims and the equivalents thereof.

We claim:

1. A platform cooling arrangement in a turbine rotor blade having a platform at an interface between an airfoil and a root, wherein the rotor blade includes an interior cooling passage formed therein that extends from a connection with a coolant source at the root to at least the approximate radial height of the platform, wherein, in operation, the interior cooling passage comprises a high-pressure coolant region and a low-pressure coolant region, along a side that coincides with a pressure side of the airfoil, a pressure side of the platform comprises a topside extending circumferentially from the airfoil to a pressure side slashface, and along a side that coincides with a suction side of the airfoil, a suction side of the platform comprises a topside extending circumferentially from the airfoil to a suction side slashface, the platform cooling arrangement comprising:

a platform slot extending circumferentially from a mouth formed through one of the pressure side slashface and the suction side slashface;

a high-pressure connector that connects the platform slot to the high-pressure coolant region of the interior cooling passage;

a low-pressure connector that connects the platform slot to the low-pressure coolant region of the interior cooling passage; and a platform cooling cartridge removably engaged within the platform slot, the platform cooling cartridge comprising one or more cartridge cooling channels.

2. The platform cooling arrangement according to claim 1, wherein:
the mouth of the platform slot is formed through the pressure side slashface;
the platform comprises a planar topside that is approximately parallel to a planar underside; and
the cartridge cooling channels are configured to channel coolant across the platform slot from the high-pressure connector to the low-pressure connector during operation.

3. The platform cooling arrangement according to claim 2, wherein the location at which the high-pressure connector connects to the platform slot opposes the location at which the low-pressure connector connects to the platform slot across the platform slot; and
wherein the cartridge cooling channels comprises heat transfer structure that, in operation, promotes the transfer of heat between the coolant and the platform cooling cartridge as the flow of coolant passes through the platform cooling cartridge.

4. The platform cooling arrangement according to claim 3, wherein the platform cooling cartridge and platform slot are configured such that:
upon assembly, a high-pressure plenum is formed between a first section of an outer wall of the platform cooling cartridge and a first section of an inner wall of the platform slot; and
a low-pressure plenum is formed between a second section of the outer wall of the platform cooling cartridge and a second section of the inner wall of the platform slot.

5. The platform cooling arrangement according to claim 4, wherein the high-pressure connector connects to the platform slot at a position within the high-pressure plenum; and
wherein the low-pressure connector connects to the platform slot at a position within the low-pressure plenum; and
wherein the cartridge cooling channels extend between the first section of the outer wall of the platform cooling cartridge and the second section of the outer wall of the platform cooling cartridge.

6. The platform cooling arrangement according to claim 4, wherein the platform slot comprises a backwall that generally opposes the mouth, the backwall arcing from a forward position in proximity to a forward edge of the mouth to an aft position in proximity to an aft edge of the mouth; and
wherein the profile of the arc corresponds in shape and approximate position to the profile of the pressure side of the airfoil where the pressure side of the airfoil intersects the platform.

7. The platform cooling arrangement according to claim 6, wherein the high-pressure plenum resides along a forward portion of the backwall, beginning just inside the mouth and extending along the backwall to a position just forward of an axial midpoint of the backwall; and
wherein the low-pressure plenum resides along an aft portion of the backwall, beginning just inside the mouth and extending along the backwall to a position just aft of the axial midpoint of the backwall.

8. The platform cooling arrangement according to claim 2, wherein the platform cooling cartridge comprises an outer face that, upon assembly, substantially blocks the mouth of the platform slot; and
wherein, upon assembly, the outer face resides flush in relation to the pressure side slashface.

9. The platform cooling arrangement according to claim 8, wherein a plurality of cooling apertures that connect to cartridge cooling channels are defined through the outer face, the cooling apertures being configured to direct a portion of the coolant flowing through the platform cooling cartridge into a slashface cavity formed between neighboring rotor blades; and
wherein the cooling apertures are configured to have a predetermined flow area, the predetermined flow area corresponding to a desired coolant impingement characteristic.

10. The platform cooling arrangement according to claim 8, wherein the outer face comprises a seal that, in operation, prevents coolant from exiting the platform slot through the mouth; and
wherein the platform slot and cartridge cooling channels are configured such that, in use, substantially all of the coolant flowing through the platform slot is returned to the interior cooling passage.

11. The platform cooling arrangement according to claim 4, wherein the heat transfer structure comprises a plurality of parallel cooling passages arranged to traverse the platform slot from the high-pressure plenum to the low-pressure plenum.

12. The platform cooling arrangement according to claim 4, wherein the platform slot comprises a planar ceiling and a planar floor that resides a substantially constant radial height from each other and are oriented such that each is substantially parallel to the platform;
wherein the platform cooling cartridge comprises a substantially constant radial height; and
wherein the substantially constant radial height of the platform cooling cartridge is just less than the substantially constant radial height of the platform slot so that, upon assembly, the platform cooling cartridge inserts snugly into the platform slot.

13. The platform cooling arrangement according to claim 2, wherein the platform cooling cartridge includes a cavity that is defined between a planar cartridge floor and a planar cartridge ceiling;
wherein a plurality of pins extended from the cartridge floor to the cartridge ceiling; and
wherein the cartridge cooling channels comprise the channels formed between a plurality of pins.

14. The platform cooling arrangement according to claim 2, wherein the platform cooling cartridge comprises a porous material that is positioned such that, in use, at least a portion of the coolant flowing from the high-pressure connector to the low-pressure connector passes through the porous material; and
wherein the pores of the porous material form the cartridge cooling channels.

15. The platform cooling arrangement according to claim 14, wherein the porous material comprises one of a metal density mesh and a metallic sponge.

16. The platform cooling arrangement according to claim 2, wherein the cartridge cooling channel comprises a serpentine cooling channel that defines a winding course between the high-pressure connector to the low-pressure connector.

17. A method of creating a platform cooling arrangement for a turbine rotor blade having a platform at an interface between an airfoil and a root, wherein the rotor blade includes an interior cooling passage formed therein that extends from a connection with a coolant source at the root to at least the approximate radial height of the platform, wherein, in operation, the interior cooling passage comprises a high-pressure coolant region and a low-pressure coolant region, along a side that coincides with a pressure side of the airfoil, a pressure side of the platform comprises a topside extending circumferentially from the airfoil to a pressure side slashface, and along a side that coincides with a suction side of the airfoil, a suction side of the platform comprises a topside extending circumferentially from the airfoil to a suction side slashface, the method comprising the steps of:

- forming a platform slot in the platform, the platform slot extending circumferentially from a mouth formed through one of the pressure side slashface and the suction side slashface;
- from within the formed platform slot, machining an high-pressure connector that connects the platform slot to the high-pressure coolant region of the interior cooling passage;
- from within the formed platform slot, machining an low-pressure connector that connects the platform slot to the low-pressure coolant region of the interior cooling passage; and
- forming a platform cooling cartridge that includes one or more platform cooling channels and comprises a predetermined size that desirably installs within the platform slot; and
- installing the platform cooling cartridge such that the platform cooling cartridge is removably contained within the platform slot;
- wherein the platform cooling channels are configured to allow a flow of coolant to pass through the platform cooling cartridge from the high-pressure connector to the low-pressure connector; and wherein the platform cooling channels are configured to promote the exchange of heat between the flow of coolant and the platform cooling cartridge as the flow of coolant passes through the platform cooling cartridge.

18. The method according to claim 17, wherein:
the mouth of the platform slot is formed through the pressure side slashface;
the platform cooling cartridge and the platform slot are configured so that, once the platform cooling cartridge is installed in the platform slot, a high-pressure plenum is formed between a first section of an outer wall of the platform cooling cartridge and a first section of aft backwall of the platform slot, and a low-pressure plenum is formed between a second section of the outer wall of the platform cooling cartridge and a second section of the backwall of the platform slot; and
the cartridge cooling channels are configured to direct coolant between the high-pressure plenum and the low-pressure plenum.

19. The method according to claim 18, wherein the high-pressure connector is machined to connect to the location of the high-pressure plenum; and
wherein the low-pressure connector is machined to connect to the low-pressure plenum.

20. The method according to claim 18, wherein the platform slot is formed via a machining process;
wherein the platform slot is formed to include a curved backwall that generally opposes the mouth, the backwall arcing from a forward position in proximity to a forward edge of the mouth to an aft position in proximity to an aft edge of the mouth; and
wherein the profile of the arc corresponds in shape and approximate position to the profile of the pressure side of the airfoil where the pressure side of the airfoil intersects the platform.

* * * * *